US007089507B2

(12) United States Patent
Lection et al.

(10) Patent No.: US 7,089,507 B2
(45) Date of Patent: Aug. 8, 2006

(54) SYSTEM AND METHOD FOR DISPLAY VIEWS USING A SINGLE STROKE CONTROL (75) Inventors: David B. Lection, Raleigh, NC (US); Steven M. Miller, Cary, NC (US); Mark E. Molander, Cary, NC (US); Keith J. Purcell, Willow Spring, NC (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/217,711

(22) Filed: Aug. 12, 2002

(65) Prior Publication Data

US 2004/0027395 A1 Feb. 12, 2004

(51) Int. Cl.
*G06F 3/00* (2006.01)
*G09G 5/00* (2006.01)
*G01C 21/30* (2006.01)

(52) U.S. Cl. ................. 715/855; 715/764; 715/850; 345/179; 701/208

(58) Field of Classification Search ............. 715/850, 715/853, 855, 764; 701/208, 200; 345/179
See application file for complete search history.

(56) References Cited

U.S. PATENT DOCUMENTS

| 5,247,284 A | 9/1993 | Fleming |
| 5,276,787 A | 1/1994 | Searby |
| 5,347,295 A | 9/1994 | Agulnick et al. |
| 5,444,833 A | 8/1995 | Kawai et al. |
| 5,485,565 A | 1/1996 | Saund et al. |
| 5,487,054 A | 1/1996 | Capps et al. |
| 5,583,833 A | 12/1996 | Capps et al. |
| 5,619,631 A | 4/1997 | Schott |
| 5,717,939 A | 2/1998 | Bricklin et al. |
| D394,609 S | 5/1998 | Kaddoura |
| 5,809,267 A | 9/1998 | Moran et al. |
| 5,848,187 A | 12/1998 | Bricklin et al. |
| 5,861,886 A | 1/1999 | Moran et al. |
| 5,864,337 A * | 1/1999 | Marvin ..................... 715/708 |
| 5,901,115 A | 5/1999 | Katzmann et al. |
| 5,930,501 A | 7/1999 | Neil |
| 5,948,040 A * | 9/1999 | DeLorme et al. ........... 701/201 |
| 5,982,382 A | 11/1999 | Benzel |

(Continued)

FOREIGN PATENT DOCUMENTS

EP      0 440 364 A2      8/1991

(Continued)

OTHER PUBLICATIONS

U.S. Appl. No. 09/811,926, filed Mar. 19, 2001, Molander.

(Continued)

*Primary Examiner*—Kieu D. Vu
*Assistant Examiner*—Ting Zhou
(74) *Attorney, Agent, or Firm*—VanLeeuwen & VanLeeuwen; Gerald R. Woods (57) ABSTRACT A system and method for displaying a geographical map using a single stylus movement is presented. A user contacts a display with the stylus and selects an area on the geographical map in which the user wishes to view. The user moves the stylus into a zoom zone which processing interprets stylus movements to either zoom in or zoom out of the map. When the user is satisfied with a magnification level corresponding to the zoom commands, the user enters a pan zone. The user moves the stylus around the selected area to view other parts of the map. Processing displays different map views corresponding to the stylus movement.

24 Claims, 7 Drawing Sheets

U.S. PATENT DOCUMENTS

| | | |
|---|---|---|
| 6,018,346 A | 1/2000 | Moran et al. |
| 6,052,110 A * | 4/2000 | Sciammarella et al. ..... 345/661 |
| 6,175,801 B1 * | 1/2001 | Millington .................. 701/207 |
| 6,201,769 B1 | 3/2001 | Lewis |
| 6,233,204 B1 | 5/2001 | Chu et al. |
| 6,275,232 B1 | 8/2001 | Cataudella et al. |
| 6,275,449 B1 | 8/2001 | Wang |
| 6,343,360 B1 | 1/2002 | Feinleib |
| 6,546,368 B1 | 4/2003 | Weninger et al. |
| 6,601,988 B1 | 8/2003 | Molander |
| 6,687,614 B1 * | 2/2004 | Ihara et al. ................. 701/209 |

FOREIGN PATENT DOCUMENTS

| | | |
|---|---|---|
| EP | 0 565 872 A2 | 10/1993 |
| EP | 0 661 620 B1 | 7/1995 |
| EP | 0 667 567 A2 | 8/1995 |

OTHER PUBLICATIONS

"Object-Picking Method by Hierarchical Hand-Marking," *IBM Technical Disclosure Bulletin*, vol. 30 No. 9, Feb. 1988 (pp. 348-350).

* cited by examiner

SYSTEM AND METHOD FOR DISPLAY VIEWS USING A SINGLE STROKE CONTROL

BACKGROUND OF THE INVENTION

1. Technical Field

The present invention relates in general to a system and method for displaying views using a single stroke control. More particularly, the present invention relates to a system and method for manipulating a digital map view on an electronic device using a pointing device, such as a stylus.

2. Description of the Related Art

Electronic devices, such as personal computers, handheld devices, and mobile phones, are used to view digital images of maps. A user may wish to view a digital map in order to plan a trip, get driving directions, or to find a city location. A user may use a server-dependent method or a self-contained method for viewing digital maps. One type of server-dependent method for viewing a digital map is using the Internet. For example, many websites offer a feature which allows a user to enter a city location and the website provides a digital map for the user to view.

One type of self-contained method is mapping software which includes digital maps for a user to load on an electronic device. The user may load the mapping software on a pervasive device, such as a handheld device, an automotive computers/GPS device, or a mobile phone, in order to have the ability to view digital maps in a mobile environment. A large percentage of these devices offer a display screen, and most devices also offer some type of stylus or pointing device to allow simple command and object selection shown on the display screen. A challenge found with the existing art is that the existing art tends to mimic a desktop computer's graphical user interface (GUI) functionality. However, in mobile applications it is important to offer the user methods of processing display data with simple commands.

Another challenge found with existing art is that the user may be required to enter multiple commands in order to view an acceptable map. For example, the user may have to select a "zoom-in" button multiple times in order to achieve a desired magnification. Once the user has achieved an appropriate magnification level, the user may need to select directional arrows to pan the digital map.

What is needed, therefore, is a way for a user to manipulate a map view using a minimal amount of command sequences.

SUMMARY

It has been discovered that the aforementioned challenges are resolved by providing an interface which allows a user to select, zoom, and pan a digital map using a single stylus touch down session. The user wishes to view a map area on an electronic device, such as a personal computer, personal digital assistant (PDA), or mobile phone. The user uses a stylus to enter commands on the electronic device which includes a display that is capable of interpreting the stylus commands. For example, the user may wish to view a map on a PDA which includes a touch-sensitive display. The user touches a touch-sensitive display with a stylus and selects an initial area selection. Without removing the stylus from the screen, the user zooms in or out to achieve an acceptable magnification level. Once the user achieves an acceptable magnification level and without lifting the stylus off the display, the user pans the digital map to locate a desired map view. Once the user locates the desired map view, the user lifts the stylus off the display.

The graphical display includes various zones that are responsive to the stylus and result the execution of a particular type of manipulation. These manipulation zones include a "zoom zone," an "area selection zone," and a "pan zone." The various zones correspond, respectively, to the zoom mode, the area selection mode, and the pan mode. While in a particular mode, the device responds by zooming, selecting, and panning the display based upon the inputs received from the user through the use of the stylus.

The electronic device displays a map which may be configured by the user as an initial default map. For example, a map of the domestic United States may be set as the initial default map. The user places the stylus on the display at a location corresponding to where the user wishes to view the digital map. When the user touches the display with the stylus, the electronic device enters an initial area selection mode. The electronic device tracks the user's stylus movement until an area selection is complete, at which point the electronic device enters a zoom mode.

Upon entering zoom mode, the electronic device superimposes zoom artifacts to assist the user in zooming in or zooming out of the digital map. The user moves the stylus in a pre-defined zoom zone to achieve an acceptable digital map magnification level. As long as the user keeps the stylus depressed on the display within the zoom zone, the electronic device stays in zoom mode. Once the user moves the stylus out of the zoom zone, the electronic device enters a pan mode. If the user lifts the stylus off the display, map view manipulation processing ends.

The user enters pan mode and moves the stylus in a direction towards the user's desired viewing location. The user is able to pan in one or more directions as long as the user keeps the stylus in contact with the display. When the user is content with the map displayed on the electronic device, the user removes the stylus from the display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
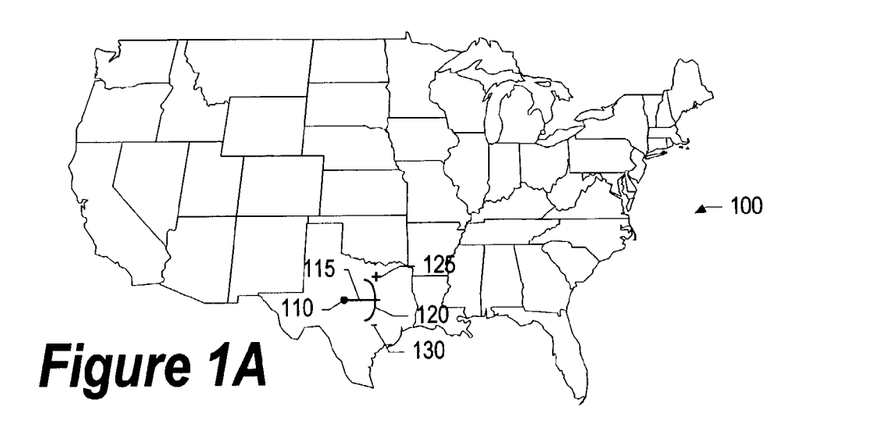
FIG. 1A is a diagram showing a user selecting an area on a map to view and manipulate the map using an arc mode.

FIG. 1A is a diagram showing a user selecting an area on a map to view and manipulate the map using an arc mode. The user wishes to view the map area on an electronic device, such as a personal computer, personal digital assistant (PDA), or mobile phone. The user uses a stylus to enter commands on the electronic device which includes a display that is capable of interpreting the stylus commands. For example, the user may wish to view a map on a PDA which includes a touch-sensitive display.

Processing displays map 100 which may be configured by the user as an initial default map. The example in FIG. 1A shows the domestic United States as the initial default map. The user places the stylus on the display at stylus touch down 110. Stylus touch down 110 is the starting location at which point the user wishes to view. When the user touches the display, processing enters an initial area selection mode. Processing tracks the user's stylus movement along line 115. When the stylus moves a predefined length away from stylus touch down 110, processing exits initial area selection mode and enters a zoom mode (see FIG. 3 for further details regarding mode changes). The pre-defined length of moving the stylus to exit the initial area selection mode and enter zoom mode may be relative to the electronic device's display size and the size of the map being displayed.

Upon entering zoom mode, processing displays zoom arc 120, zoom indicator 125, and zoom indicator 130. The user moves the stylus along zoom arc 120 to zoom in or zoom out of the map. As long as the user keeps the stylus depressed on the display along zoom arc 120, processing stays in zoom mode. Zoom arc 120 may be a certain width, such as ⅛ inch, to make it easier for the user to keep the stylus within zoom arc 120. Zoom indicator 125 and zoom indicator 130 indicate to the user which direction to move the stylus along zoom arc 120 to zoom in or zoom out of the map. In the example shown in FIG. 1A, zoom indicator 125 indicates that the user move the stylus up along zoom arc 120 to zoom in to the map. The example in FIG. 1A also shows that zoom indicator 130 indicates that the user move the stylus down along zoom arc 120 to zoom out of the map. When the user enters zoom mode, the user is able to zoom in and zoom out as long as the stylus stays in contact with the display and stays within zoom arc 120 (see FIG. 1B and corresponding text for further details regarding zooming).

Figure 1B:
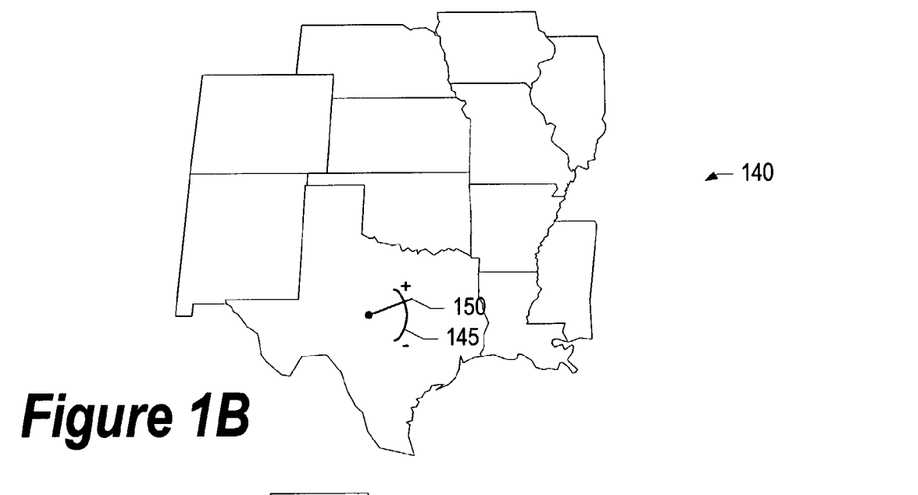
FIG. 1B is a diagram showing a user zooming in on a selected map location using an arc mode.

FIG. 1B is a diagram showing a user zooming in on a selected map location using an arc mode. The user wishes to zoom in or zoom out of the map area on an electronic device, such as a personal computer, personal digital assistant (PDA), or mobile phone. The user moves a stylus to enter zoom commands on the electronic device which includes a display that is capable of interpreting the stylus commands. For example, the user may wish to manipulate a map on a PDA which includes a touch-sensitive display.

The user moves the stylus along zoom arc 145 in an upwards direction to zoom in on the map. Processing zooms in the map and displays map 140 on the display. In one embodiment, processing may retrieve and display a separate map based upon the user's zoom commands. In another embodiment, processing may use the existing map and manipulate (i.e. expand or contract) the map pixels in response to the user's zoom commands. As the user increases the zoom magnification, more map detail may appear. For example, the user may increase the magnification to a point where highways, major streets, and neighborhood streets are displayed.

The user may move the stylus many times along zoom arc 145 to zoom in or zoom out in order to achieve an acceptable map scale. Once the user achieves an acceptable map scale, the user keeps the stylus in contact with the display and moves the stylus away from zoom arc 145 to enter pan mode (see FIG. 1C and corresponding text for further details regarding pan mode).

Figure 1C:
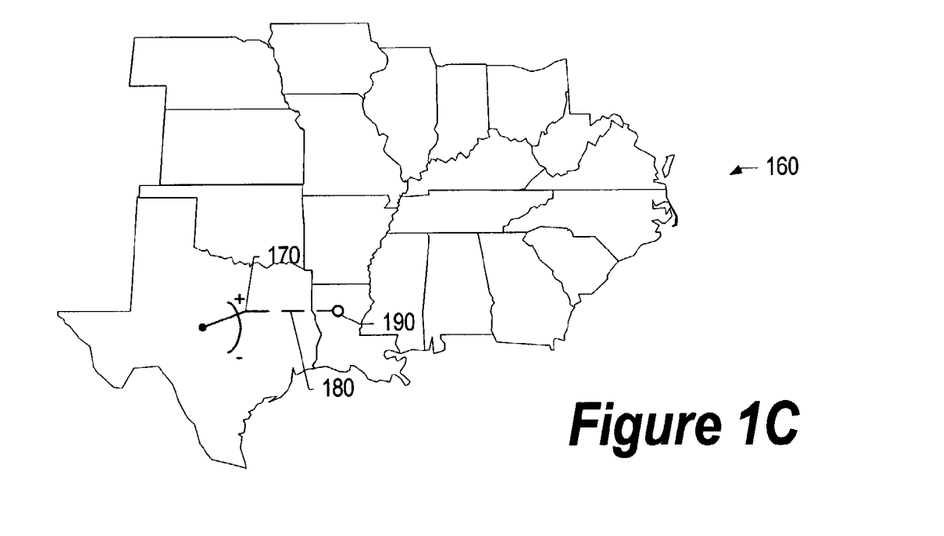
FIG. 1C is a diagram showing a user panning a selected map using an arc mode.

FIG. 1C is a diagram showing a user panning a selected map using an arc mode. The user wishes to pan the map on an electronic device, such as a personal computer, personal digital assistant (PDA), or mobile phone. The user moves a stylus to pan in one or more direction on the electronic device which includes a display that is capable of interpreting the stylus commands. For example, the user may wish to manipulate a map on a PDA which includes a touch-sensitive display.

The user enters pan mode at location 170 which corresponds to the location at which the user leaves zoom mode (see FIG. 1B and corresponding text for further details regarding zoom mode). The user moves the stylus along line 180 in an eastward direction to have processing display eastern map 160. The user is able to pan in one or more directions as long as the user keeps the stylus in contact with the display. Processing "drags" the map in response to the stylus movements. For example, processing drags the map to the right when the user moves the stylus to the right. When the user is content with the map displayed on the electronic device, the user removes the stylus from the display at stylus liftoff point 190. Processing exits pan mode at this time and waits for further user requests.

Figures 2A, 2B:
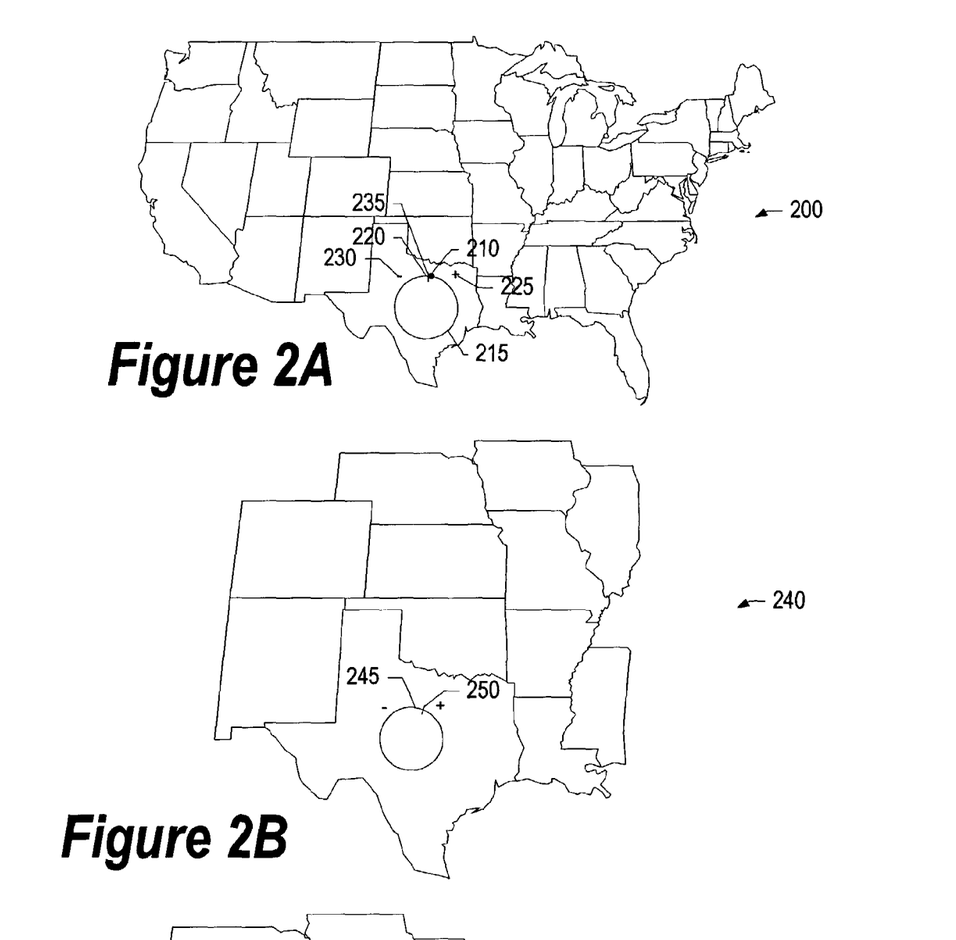
FIG. 2A is a diagram showing a user selecting an area on a map to view and manipulate the map using a circle mode.
FIG. 2B is a diagram showing a user zooming in on a selected map location using a circle mode.

FIG. 2A is a diagram showing a user selecting an area on a map to view and manipulate the map using a circle mode. The user wishes to view the map area on an electronic device, such as a personal computer, personal digital assistant (PDA), or mobile phone. The user uses a stylus to enter commands on the electronic device which includes a display that is capable of interpreting the stylus commands. For example, the user may wish to view a map on a PDA which includes a touch-sensitive display.

Processing displays map 200 which may be configured by the user as an initial default map. The example in FIG. 2A shows the domestic United States as the initial default map. The user places the stylus on the display at stylus touch down 210. Stylus touch down 210 is the starting location where the user starts making a circle corresponding to the location that the user wishes to view. When the user touches the display, processing enters an initial area selection mode. Processing tracks the user's stylus movement along circle 215. When the stylus makes a complete circle and reaches point 220, processing exits initial area selection mode and enters a zoom mode (see FIG. 3 for further details regarding mode changes).

Upon entering zoom mode, processing displays zoom circle 215, zoom indicator 225, zoom indicator 230, and zoom hash 235. The user moves the stylus along zoom circle 215 to zoom in or zoom out of the map. Zoom hash 235 moves corresponding to the stylus movements. As long as the user keeps the stylus depressed on the display along zoom circle 215, processing stays in zoom mode. Zoom circle 215 may be a certain width, such as ⅛ inch, to make it easier for the user to keep the stylus within zoom circle 215. Zoom indicator 225 and zoom indicator 230 indicate to the user which direction to move the stylus along zoom circle 215 to zoom in or zoom out of the map. In the example shown in FIG. 2A, zoom indicator 225 indicates that the user move the stylus clockwise along zoom circle 215 to zoom in to the map. The example in FIG. 2A also shows that zoom indicator 230 indicates that the user move the stylus counterclockwise along zoom circle 215 to zoom out of the map. When the user enters zoom mode, the user is able to zoom in and zoom out as long as the stylus stays in contact with the display and stays within zoom circle 215 (see FIG. 2B and corresponding text for further details regarding zooming).

FIG. 2B is a diagram showing a user zooming in on a selected map location using a circle mode. The user wishes to zoom in or zoom out of the map area on an electronic device, such as a personal computer, personal digital assistant (PDA), or mobile phone. The user moves a stylus to enter zoom commands on the electronic device which includes a display that is capable of interpreting the stylus commands. For example, the user may wish to manipulate a map on a PDA which includes a touch-sensitive display.

The user moves zoom hash 250 along zoom circle 245 in a clockwise direction using the stylus to zoom in on the map. Processing zooms in the map and displays map 240 on the display. In one embodiment, processing may retrieve and display a separate map based upon the user's zoom commands. In another embodiment, processing may use the existing map and manipulate (i.e. expand or contract) the map pixels in response to the user's zoom commands. As the user increases the zoom magnification, more map detail may appear. For example, the user may increase the magnification to a point where highways, major streets, and neighborhood streets are displayed.

The user may move zoom hash 250 many times along zoom circle 245 to zoom in or zoom out in order to achieve an acceptable map scale. Once the user achieves an acceptable map scale, the user keeps the stylus in contact with the display and moves the stylus away from zoom circle 245 to enter pan mode (see FIG. 2C and corresponding text for further details regarding pan mode).

Figure 2C:
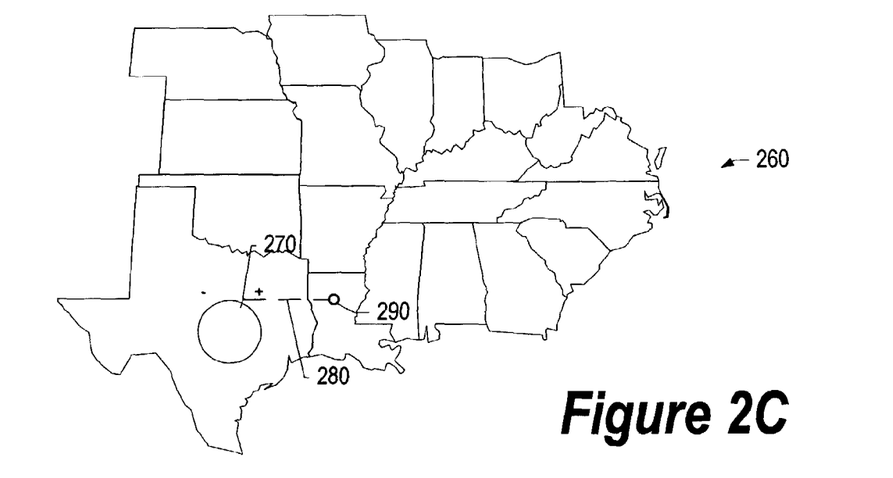
FIG. 2C is a diagram showing a user panning a selected map using a circle mode.

FIG. 2C is a diagram showing a user panning a selected map using a circle mode. The user wishes to pan the map on an electronic device, such as a personal computer, personal digital assistant (PDA), or mobile phone. The user moves a stylus to pan in one or more direction on the electronic device which includes a display that is capable of interpreting the stylus commands. For example, the user may wish to manipulate a map on a PDA which includes a touch-sensitive display.

The user enters pan mode at location 270 which corresponds to the location at which the user leaves zoom mode (see FIG. 2B and corresponding text for further details regarding zoom mode). The user moves the stylus along line 280 in an eastward direction to have processing display eastern map 260. The user is able to pan in one or more directions as long as the user keeps the stylus in contact with the display. Processing "drags" the map in response to the stylus movements. For example, processing drags the map to the right when the user moves the stylus to the right. When the user is content with the map displayed on the electronic device, the user removes the stylus from the display at stylus liftoff point 290. Processing exits pan mode at this time and waits for further user requests.

Figure 3:
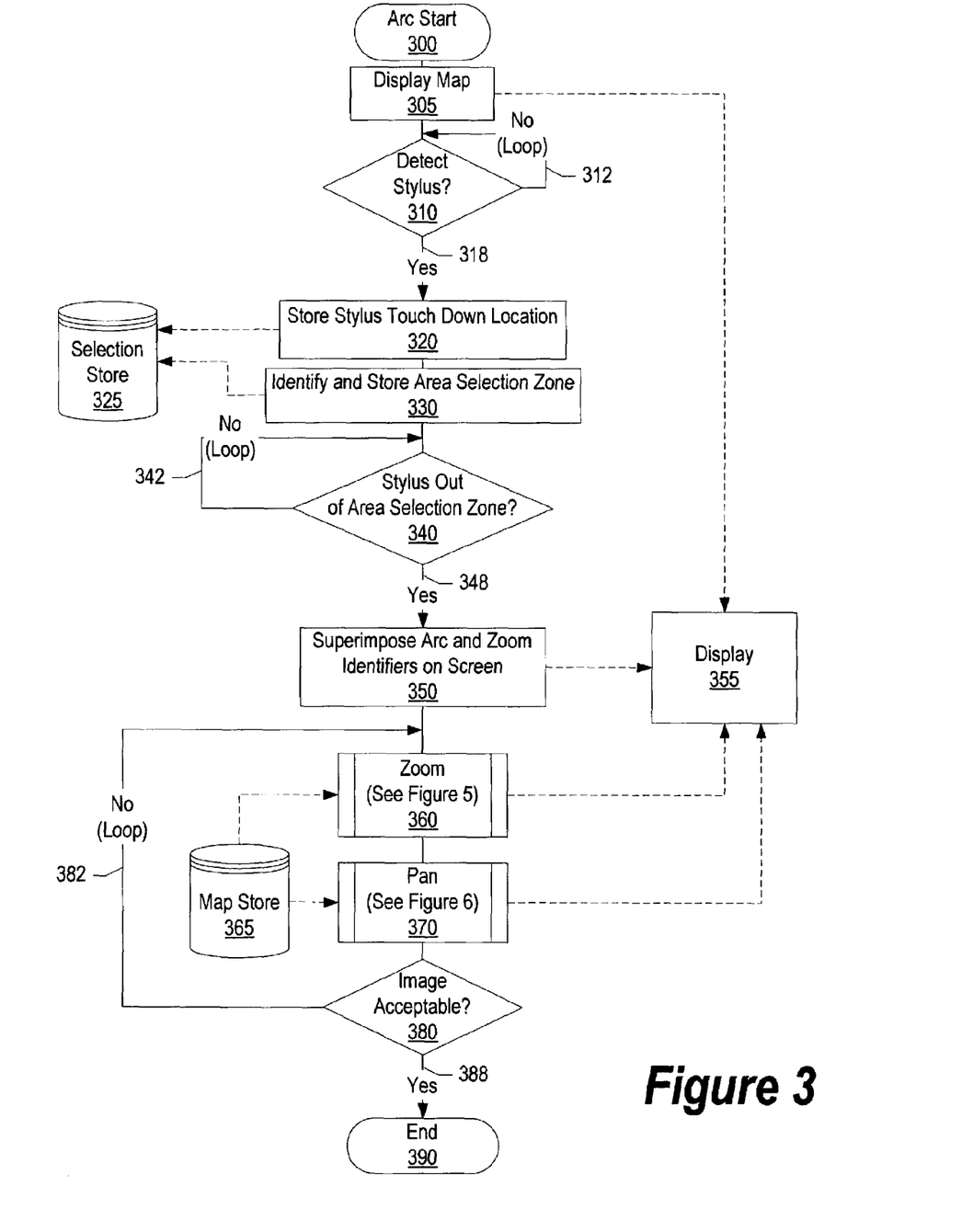
FIG. 3 is a high-level flowchart showing steps taken in a user using an arc mode to select, zoom, and pan a map area using a single stylus stroke.

FIG. 3 is a high-level flowchart showing steps taken in a user using an arc mode to select, zoom, and pan a map area using a single stylus stroke. The user wishes to view the map area on an electronic device using a stylus, such as a personal computer, personal digital assistant (PDA), or mobile phone. The electronic device includes a display that is capable of interpreting stylus commands. For example, the user may wish to view a map on a PDA which includes a touch-sensitive display. Arc processing commences at 300, whereupon processing displays an initial map on display 355 at step 305. In one embodiment, the user may configure a default map view. For example, if the user frequently travels in the domestic United States, the user may set the default map view to show the domestic United States.

A determination is made as to whether the user has "touched down" the stylus on the display (decision 310). If the user has not yet touched down the stylus on the display, decision 310 branches to "No" branch 312 which loops back to monitor for a stylus touchdown. This looping continues until the stylus touches down on the display, at which point decision 310 branches to "Yes" branch 318. Processing stores the stylus touch down location in selection store 325 (step 320). Processing uses the stylus touch down location as a center point in zoom mode (see FIG. 5 and corresponding text for further details regarding zoom mode).

Processing identifies and stores an area selection zone in selection store 325 at step 330. Processing uses the area selection zone to determine when the user wishes to enter zoom mode. In one embodiment, the area selection zone may be proportionate to the size of the user's display. Using the example described above, the user's PDA display may be three inches square, in which case the area selection zone may be one inch in diameter whereupon the stylus touch down location is the center of the area selection zone. A determination is made as to whether the user has moved the stylus out of the area selection zone and wishes to enter a manipulation mode (decision 340). Zoom mode and pan mode are to types of manipulation modes in which each mode has associated commands to alter the map view. Processing detects which mode the user wishes to enter commands based upon the stylus movement entering a zoom zone or a pan zone (see FIGS. 5 through 6 and corresponding text for further details regarding zoom mode and pan mode). If the stylus has not left the area selection zone, decision 340 branches to "No" branch 342 which loops back to wait for the stylus to leave the area selection zone. This looping continues until the user moves the stylus out of the area selection zone, at which point decision 340 branches to "Yes" branch 348.

Processing superimposes a zoom arc over the map on display 355 which includes zoom identifiers (step 350). For example, the zoom identifiers may be a positive and negative sign indicating to the user which direction to move his stylus to zoom in or zoom out of the map (see FIG. 1B and corresponding text for further details regarding zoom arc and zoom identifiers). Processing enters zoom mode and the user is able to enter various manipulation commands (i.e. zoom commands) which instruct processing to display various zoom map views on display 355 which are retrieved from map store 365 (pre-defined process block 360, see FIG. 5 and corresponding text for further details). Map store 365 may be stored on a non-volatile storage area, such as non-volatile memory. In one embodiment, processing may expand or contract the selected map view corresponding to the user's zoom selection rather than retrieving separate maps.

After the user is satisfied with a zoom view and moves his stylus out of a zoom zone, processing enters pan mode and the user is able to enter various manipulation commands (i.e. pan commands) by moving his stylus in various directions to "pan" around the map. Processing retrieves map views from map store 365 and displays the maps on display 355 (pre-defined process block 370, see FIG. 6 and corresponding text for further details).

A determination is made as to whether the user has lifted the stylus off the display (decision 380). If the user has not lifted the stylus off the display, the user may wish to continue manipulating the map view, and decision 380 branches to "No" branch 382 which loops back to process more stylus movements. This looping continues until the user removes the stylus from the display, at which point decision 380 branches to "Yes" branch 388. Processing ends at 390.

Figure 4:
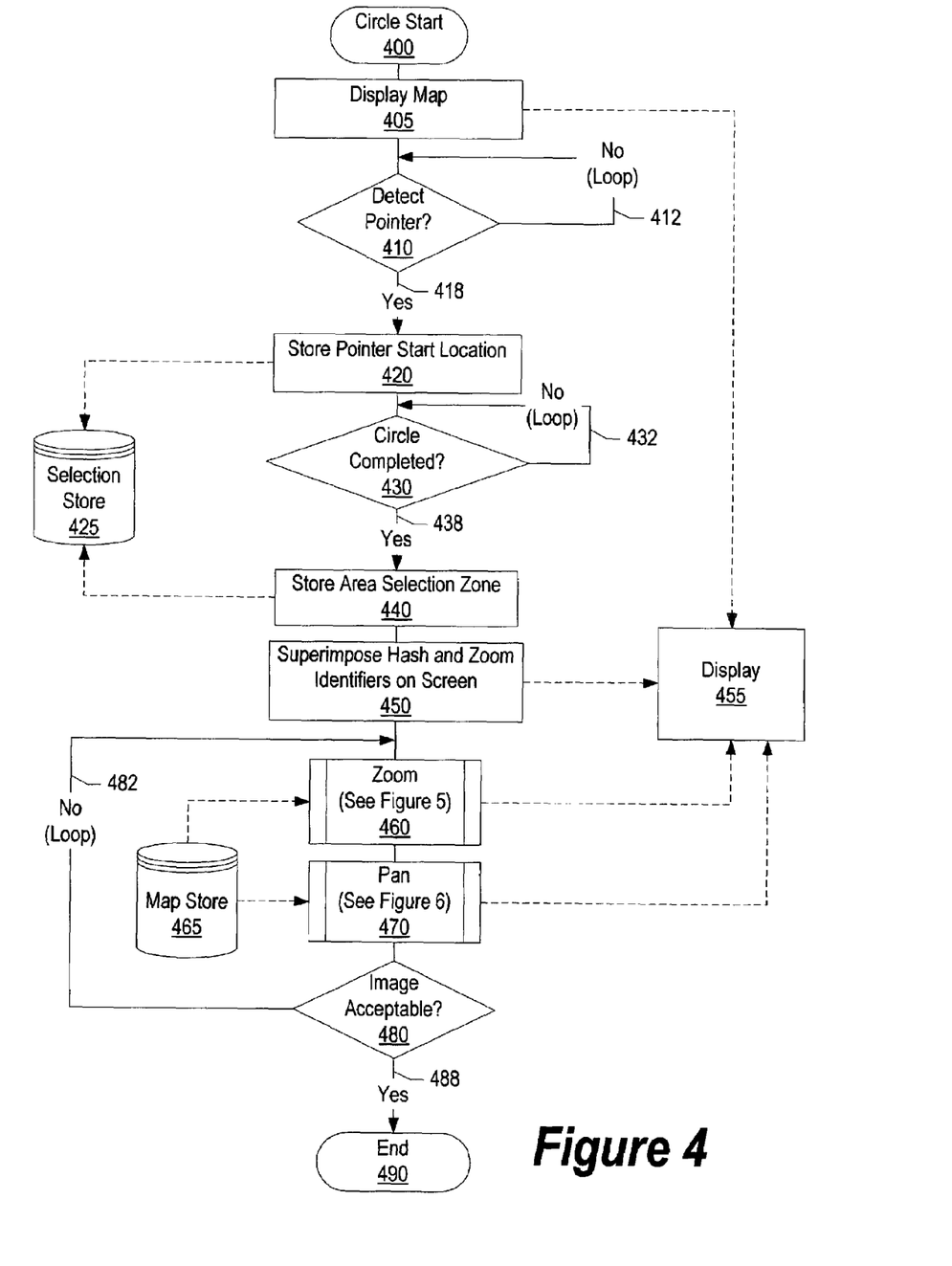
FIG. 4 is a high-level flowchart showing steps taken in a user using a circle mode to select, zoom, and pan a map area using a single stylus stroke.

FIG. 4 is a high-level flowchart showing steps taken in a user using a circle mode to select, zoom, and pan a map area using a single stylus stroke. The user wishes to view the map area on an electronic device using a stylus, such as a personal computer, personal digital assistant (PDA), or mobile phone. The electronic device includes a display that is capable of interpreting stylus commands. For example, the user may wish to view a map on a PDA which includes a touch-sensitive display. Circle processing commences at 400, whereupon processing displays an initial map on display 455 at step 405. In one embodiment, the user may configure a default map view. For example, if the user frequently travels in the domestic United States, the user may set the default map view to show the domestic United States.

A determination is made as to whether the user has "touched down" the stylus on the display (decision 410). If the user has not yet touched down the stylus on the display, decision 410 branches to "No" branch 412 which loops back to monitor for a stylus touchdown. This looping continues until the stylus touches down on the display, at which point decision 410 branches to "Yes" branch 418. Processing stores the stylus touch down location in selection store 425 (step 420). Processing uses the stylus touch down location to determine when a complete circle is completed (see below).

A determination is made as to whether the user has completed a circle using his stylus (decision 430). If the circle has not been completed, decision 430 branches to "No" branch 432 which loops back to monitor stylus movements. This looping continues until a circle is completed, at which point decision 430 branches to "Yes" branch 438. Processing stores an area selection zone corresponding to the circle in selection store 425 at step 440. Processing uses the area selection zone to determine when the user wishes to enter a manipulation mode mode. Zoom mode and pan mode are to types of manipulation modes in which each mode has associated commands to alter the map view. Processing detects which mode the user wishes to enter commands based upon the stylus movement entering a zoom zone or a pan zone (see FIGS. 5 through 6 and corresponding text for further details regarding zoom mode and pan mode). In one embodiment, processing may change the scale of the map when the circle is completed based upon the circle perimeter. For example, processing may change the map scale such that the circle perimeter is at the edges of the electronic device's display.

Processing superimposes a zoom circle over the map on display 455 which includes zoom identifiers (step 450). For example, the zoom identifiers may be a positive and negative sign indicating to the user which direction to move his stylus to zoom in or zoom out of the map (see FIG. 2B and corresponding text for further details regarding zoom circle and zoom identifiers). Processing enters zoom mode and displays various zoom map views on display 455 which are retrieved from map store 465 (predefined process block 460, see FIG. 5 and corresponding text for further details). Map store 465 may be stored on a non-volatile storage area, such as non-volatile memory. In one embodiment, processing may expand or contract the selected map view corresponding to the user's zoom selection rather than retrieving separate maps.

After the user is satisfied with a zoom view and moves his stylus out of a zoom zone, processing enters pan mode which allows the user to move his stylus in various directions to "pan" around the map. Processing retrieves map views from map store 465 and displays the maps on display 455 (pre-defined process block 470, see FIG. 6 and corresponding text for further details).

A determination is made as to whether the user has lifted the stylus off the display (decision 480). If the user has not lifted the stylus off the display, the user may wish to continue manipulating the map view, and decision 480 branches to "No" branch 482 which loops back to process more stylus movements. This looping continues until the user removes the stylus from the display, at which point decision 480 branches to "Yes" branch 488. Processing ends at 490.

Figure 5:
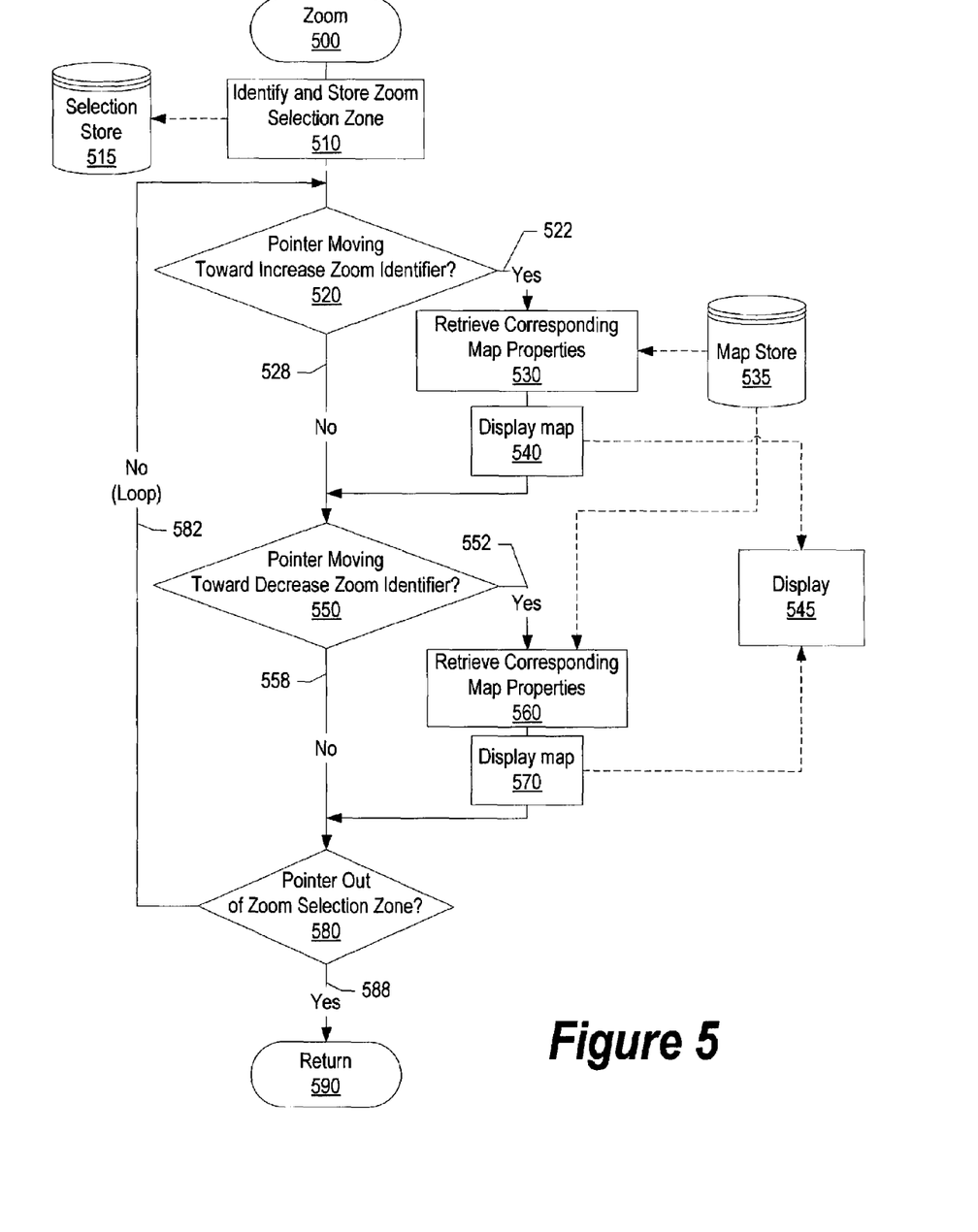
FIG. 5 is a flowchart showing steps taken in a user zooming in and out of a selected map area.

FIG. 5 is a flowchart showing steps taken in a user zooming in and out of a selected map area. The user wishes to view various map views on an electronic device using a stylus, such as a personal computer, personal digital assistant (PDA), or mobile phone. The electronic device includes a display that is capable of interpreting stylus commands. For example, the user may wish to view a map on a PDA which includes a touch-sensitive display. The user chooses a map area selection as a point to zoom in or out (see FIG. 3 and corresponding text for further details regarding map area selection). When the user moves his stylus out of an area selection zone, zoom mode processing commences at 500, whereupon processing identifies and stores a zoom selection zone in selection store 515 (step 510). The zoom selection zone is a pre-defined area along a zoom arc (see FIG. 1B and corresponding text for further details regarding zoom selection zone). Processing stays in zoom mode as long as the user keeps the stylus in the zoom selection zone (see below for further details regarding exiting zoom mode).

A determination is made as to whether the user wishes to zoom in on the selected map (decision 520). If the user wishes to zoom in on the map, decision 520 branches to "Yes" branch 522 whereupon processing retrieves a corresponding zoom map view from map store 535 (step 530). The zoom map view is displayed on display 545 at step 540. In one embodiment, processing may expand or contract the existing map view corresponding to the user's zoom selection rather than retrieving separate zoom map views.

On the other hand, if the user does not wish to zoom in on the selected map, decision 520 branches to "No" branch 528 bypassing zoom-in steps. A determination is made as to whether the user wishes to zoom out of the selected map (decision 550). If the user wishes to zoom out of the map, decision 550 branches to "Yes" branch 552 whereupon processing retrieves a corresponding zoom map view from map store 535 (step 560). The zoom map view is displayed on display 545 at step 570. In one embodiment, processing may expand or contract the existing map view corresponding to the user's zoom selection rather than retrieving separate zoom map views.

On the other hand, if the user does not wish to zoom out on the selected map, decision 550 branches to "No" branch 558 bypassing zoom out steps. A determination is made as to whether the user wishes to exit zoom mode by detecting whether the user has moved the stylus out of the zoom selection zone (decision 580). If the user still wishes to zoom in and out of the map, decision 580 branches to "No" branch 582 which loops back to process more stylus movements. This looping continues until the user moves the pointer out of the zoom selection zone, at which point decision 580 branches to "Yes" branch 588. Processing returns at 590.

Figure 6:
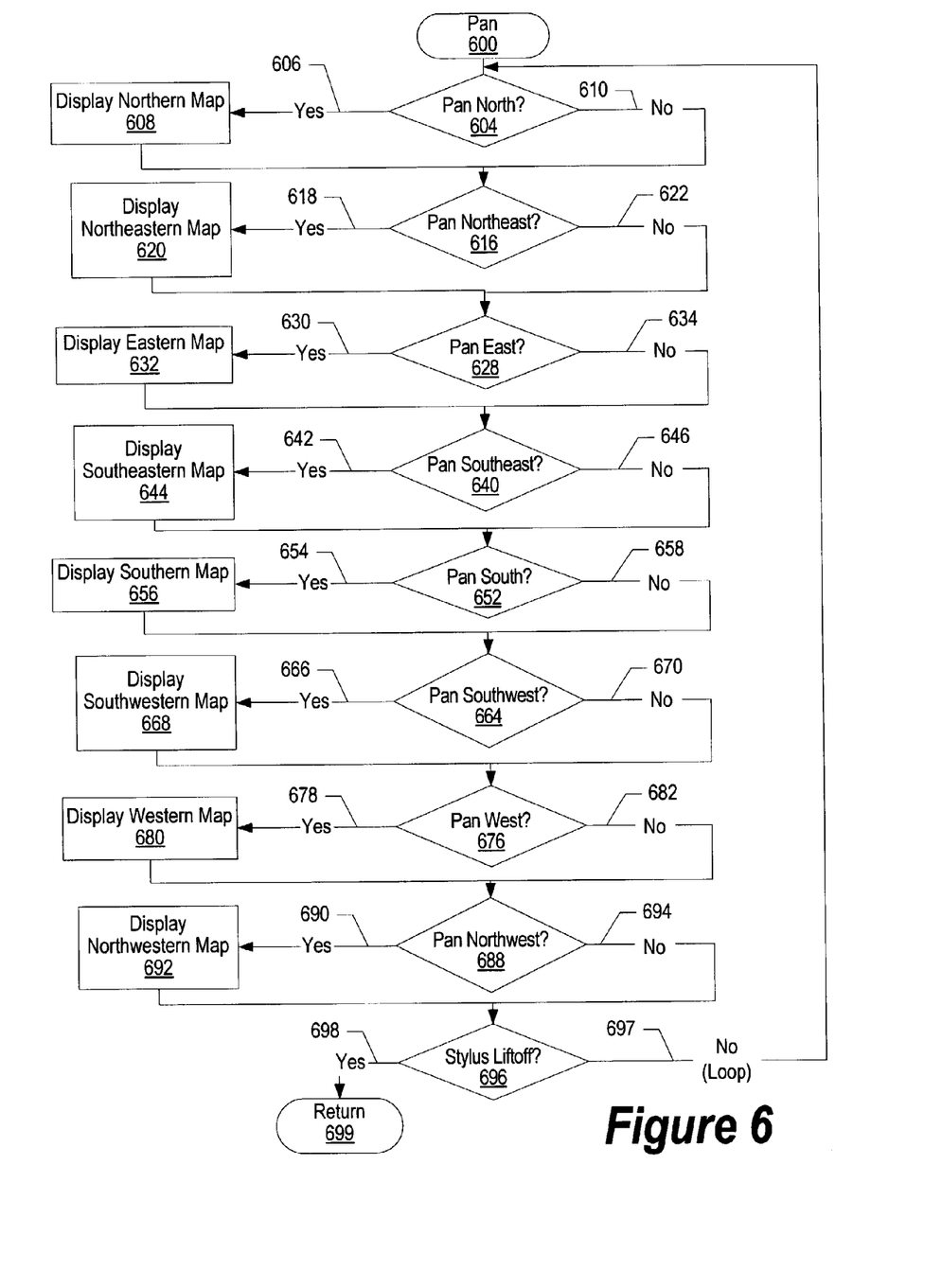
FIG. 6 is a flowchart showing steps taken in a user panning a selected map area.

FIG. 6 is a flowchart showing steps taken in a user panning a selected map area. The user wishes to pan the map area on an electronic device in various directions (i.e. north, south, east, west, etc.) using a stylus. The electronic device includes a display that is capable of interpreting stylus commands. For example, the user may wish to pan a map on a PDA which includes a touch-sensitive display. In one embodiment, processing may display a different cursor type when entering pan mode. For example, processing may display an arrow while in initial area selection mode and zoom mode, and change the arrow to a hand symbol when entering pan mode (see FIGS. 3 through 5 for further details regarding initial area selection and zoom mode).

Pan mode processing commences at 600, whereupon a determination is made as to whether the user moves the stylus in a northern direction (i.e. up) (decision 604). For example, the display may be showing the state of Missouri and the user wishes to pan north to Iowa. If the user moves the stylus in a northern direction, decision 604 branches to "Yes" branch 606 whereupon processing displays a map north of the existing displayed map (step 608). On the other hand, if the user does not move the stylus in a northern direction, decision 604 branches to "No" branch 610 bypassing northern display steps.

A determination is made as to whether the user moves the stylus in a northeastern direction (i.e. upper right direction on the display) (decision 616). Using the example described above, the display may be showing Missouri and the user wishes to pan northeast to northern Illinois. If the user moves the stylus in a northeastern direction, decision 616 branches to "Yes" branch 618 whereupon processing displays a map northeast of the existing displayed map (step 620). On the other hand, if the user does not move the stylus in a northeastern direction, decision 616 branches to "No" branch 622 bypassing northeastern display steps.

A determination is made as to whether the user moves the stylus in an eastern direction (i.e. right) (decision 628). Using the example described above, the display may be showing Missouri and the user wishes to pan east to view central Illinois. If the user moves the stylus in an eastern direction, decision 628 branches to "Yes" branch 630 whereupon processing displays a map east of the existing displayed map (step 632). On the other hand, if the user does not move the stylus in an eastern direction, decision 628 branches to "No" branch 634 bypassing eastern display steps.

A determination is made as to whether the user moves the stylus in a southeastern direction (i.e. lower right) (decision 640). Using the example described above, the display may be showing Missouri and the user wishes to pan southeast to view Tennessee. If the user moves the stylus in a southeastern direction, decision 640 branches to "Yes" branch 642 whereupon processing displays a map southeast of the existing displayed map (step 644). On the other hand, if the user does not move the stylus in a southeastern direction, decision 640 branches to "No" branch 646 bypassing southeastern display steps.

A determination is made as to whether the user moves the stylus in a southern direction (i.e. down) (decision 652). Using the example described above, the display may be showing Missouri and the user wishes to pan south to view Arkansas. If the user moves the stylus in a southern direction, decision 652 branches to "Yes" branch 654 whereupon processing displays a map south of the existing displayed map (step 656). On the other hand, if the user does not move the stylus in a southern direction, decision 652 branches to "No" branch 658 bypassing southern display steps.

A determination is made as to whether the user moves the stylus in a southwestern direction (i.e. lower left) (decision 664). Using the example described above, the display may be showing Missouri and the user wishes to pan southwest to view Oklahoma. If the user moves the stylus in a southwestern direction, decision 664 branches to "Yes" branch 666 whereupon processing displays a map southwest of the existing displayed map (step 668). On the other hand, if the user does not move the stylus in a southwestern direction, decision 664 branches to "No" branch 670 bypassing southwestern display steps.

A determination is made as to whether the user moves the stylus in a western direction (i.e. left) (decision 676). Using the example described above, the display may be showing Missouri and the user wishes to pan west to view Kansas. If the user moves the stylus in a western direction, decision 676 branches to "Yes" branch 678 whereupon processing displays a map west of the existing displayed map (step 680). On the other hand, if the user does not move the stylus in a western direction, decision 676 branches to "No" branch 682 bypassing western display steps.

A determination is made as to whether the user moves the stylus in a northwestern direction (i.e. upper left) (decision 688). Using the example described above, the display may be showing Missouri and the user wishes to pan northwest to view Nebraska. If the user moves the stylus in a northwestern direction, decision 688 branches to "Yes" branch 690 whereupon processing displays a map northwest of the existing displayed map (step 692). On the other hand, if the user does not move the stylus in a northwestern direction, decision 688 branches to "No" branch 694 bypassing northwestern display steps.

In one embodiment, the electronic device may have more or less pan resolution than what is shown in FIG. 6. For example, the electronic device may have the pan area separated into twenty-four segments whereas processing monitors the stylus movements to move from one segment to a different segment and manipulates the displayed map accordingly.

A determination is made as to whether the user lifts the stylus off the display (decision 696). The user may wish to pan in multiple directions in which case the user continues to keep the stylus on the display in order to stay in pan mode. If the user has not lifted the stylus off the display, decision 696 branches to "No" branch 697 which loops back to process more stylus movements. This looping continues until the user lifts the stylus off the display, at which point decision 696 branches to "Yes" branch 698. Processing returns at 699.

Figure 7:
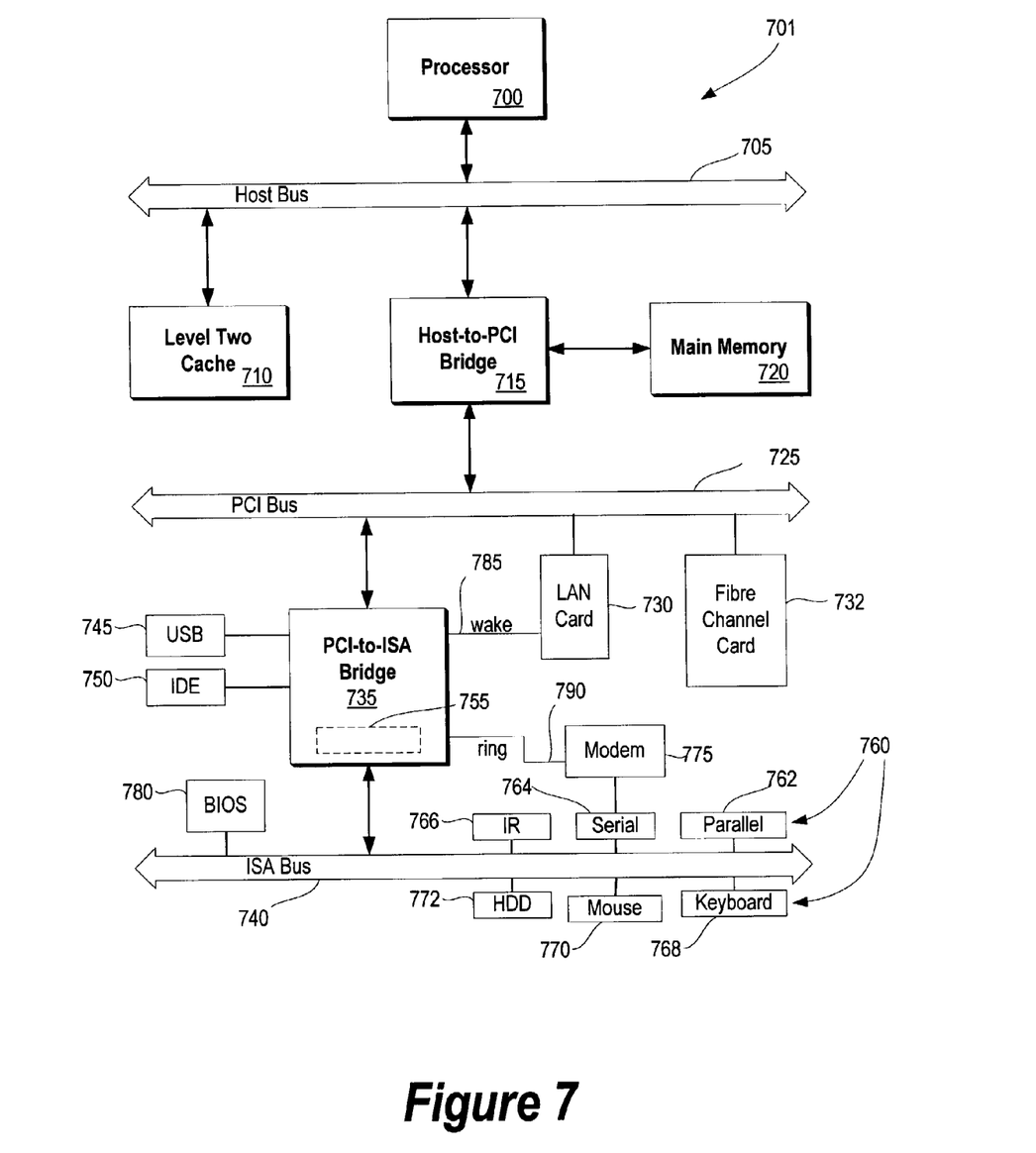
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for handling views of a geographical map using a single stylus movement, said method comprising:
    displaying the geographical map on a display;
    detecting a stylus touch down location and a stylus movement, the stylus touch down location beginning the single stylus movement and corresponding to a location where the stylus contacts the display, and the stylus movement corresponding to a plurality of second locations to which the stylus is moved while contacting the display;
    detecting, during the single stylus movement, that the stylus entered a first manipulation zone;
    performing, during the single stylus movement, a first manipulation command in response to the stylus entering the first manipulation zone;
    displaying a first altered geographical map that results from performing the first manipulation command to the geographical map;
    detecting, during the single stylus movement, that the stylus exits the first manipulation zone and enters a second manipulation zone, the second manipulation zone different than the first manipulation zone;
    performing, during the single stylus movement, a second manipulation command in response to the stylus entering the second manipulation zone, the second manipulation command being different than the first manipulation command;
    displaying a second altered geographical map that results from performing the second manipulation command to the first altered geographical map; and
    after performing the first manipulation command and the second manipulation command, detecting a stylus lift-off point that identifies the stylus lifting off the display, which ends the single stylus movement.

2. The method as described in claim 1 further comprising:
    wherein the first manipulation zone is a zoom zone and the first manipulation command is a zoom command; and
    wherein the second manipulation zone is a pan zone and the second manipulation command is a pan command.

3. The method as described in claim 1 further comprising:
    superimposing a first stylus identifier on the geographical map in response to the detecting, the location of the first stylus identifier corresponding to the stylus movement; and changing the first stylus identifier to a second stylus identifier in response to the stylus movement entering the second manipulation zone, and wherein the second stylus identifier is different than the first stylus identifier.

4. The method as described in claim 1 further comprising:
selecting a manipulation mode wherein the manipulation mode is selected from the group consisting of an arc mode and a circle mode.

5. The method as described in claim 1 further comprising:
superimposing a zoom arc on the geographical map wherein the first manipulation zone is a zoom zone and wherein the zoom zone corresponds to the zoom arc.

6. The method as described in claim 1 further comprising:
superimposing a zoom circle on the geographical map wherein the first manipulation zone is a zoom zone and wherein the zoom zone corresponds to the zoom circle.

7. The method as described in claim 1 wherein the second manipulation command is a pan command wherein the pan command includes a panning direction, the method further comprising:
moving a panning distance on the first altered geographical map corresponding to the panning direction, the moving resulting in the second altered geographical map.

8. An information handling system comprising:
one or more processors;
a memory accessible by the processors;
one or more nonvolatile storage devices accessible by the processors;
a display accessible by the processors; and
a map handling tool to handle views of a geographical map using a single stylus movement, the map handling tool including:
   display logic for displaying the geographical map on the display;
   stylus touch down detection logic for detecting a stylus touch down location and a stylus movement, the stylus touch down location beginning the single stylus movement and corresponding to a location where the stylus contacts the display, and the stylus movement corresponding to a plurality of second locations to which the stylus is moved while contacting the display;
   first manipulation zone detection logic for detecting, during the single stylus movement, that the stylus entered a first manipulation zone;
   first manipulation command logic for performing, during the single stylus movement, a first manipulation command in response to the stylus entering the first manipulation zone;
   display logic for displaying a first altered geographical map that results from performing the first manipulation command to the geographical map;
   second manipulation zone detection logic for detecting, during the single stylus movement, that the stylus exits the first manipulation zone and enters a second manipulation zone, the second manipulation zone different than the first manipulation zone;
   second manipulation command logic for performing, during the single stylus movement, a second manipulation command in response to the stylus entering the second manipulation zone, the second manipulation command being different than the first manipulation command;
   the display logic for displaying a second altered geographical map that results from performing the second manipulation command to the first altered geographical map; and
   stylus lift off logic for, after performing the first manipulation command and the second manipulation command, detecting a stylus liftoff point that identifies the stylus lifting off the display, which ends the single stylus movement.

9. The information handling system as described in claim 8 further comprising:
wherein the first manipulation zone is a zoom zone and the first manipulation command is a zoom command; and
wherein the second manipulation zone is a pan zone and the second manipulation command is a pan command.

10. The information handling system as described in claim 8 further comprising:
imaging logic for superimposing a first stylus identifier on the geographical map in response to the detecting, the location of the first stylus identifier corresponding to the stylus movement; and
stylus logic for changing the first stylus identifier to a second stylus identifier in response to the stylus movement entering the second manipulation zone, and wherein the second stylus identifier is different than the first stylus identifier.

11. The information handling system as described in claim 8 further comprising:
imaging logic for superimposing a zoom arc on the geographical map wherein the first manipulation zone is a zoom zone and wherein, the zoom zone corresponds to the zoom arc.

12. The information handling system as described in claim 8 further comprising:
imaging logic for superimposing a zoom circle on the geographical map wherein the first manipulation zone is a zoom zone and wherein the zoom zone corresponds to the zoom circle.

13. The information handling system as described in claim 8 wherein the second manipulation command is a pan command wherein the pan command includes a panning direction, the information handling system further comprising:
tracking logic for moving a panning distance on the first altered geographical map corresponding to the panning direction, the moving resulting in the second altered geographical map.

14. A computer program product stored in a computer storage media for handling views of a geographical map, said computer program product comprising:
means for displaying the geographical map on a display;
means for detecting a stylus touch down location and a stylus movement, the stylus touch down location beginning the single stylus movement and corresponding to a location where the stylus contacts the display, and the stylus movement corresponding to a plurality of second locations to which the stylus is moved while contacting the display;
means for detecting, during the single stylus movement, that the stylus entered a first manipulation zone;
means for performing, during the single stylus movement, a first manipulation command in response to the stylus entering the first manipulation zone;
means for displaying a first altered geographical map that results from performing the first manipulation command to the geographical map;

means for detecting, during the single stylus movement, that the stylus exits the first manipulation zone and enters a second manipulation zone, the second manipulation zone different than the first manipulation zone;

means for performing, during the single stylus movement, a second manipulation command in response to the stylus entering the second manipulation zone, the second manipulation command being different than the first manipulation command;

means for displaying a second altered geographical map that results from performing the second manipulation command to the first altered geographical map; and means for, after performing the first manipulation command and the second manipulation command, detecting a stylus liftoff point that identifies the stylus lifting off the display, which ends the single stylus movement.

15. The computer program product as described in claim 14 further comprising:
wherein the first manipulation zone is a zoom zone and the first manipulation command is a zoom command; and
wherein the second manipulation zone is a pan zone and the second manipulation command is a pan command.

16. The computer program product as described in claim 14 further comprising:
means for superimposing a first stylus identifier on the geographical map in response to the detecting, the location of the first stylus identifier corresponding to the stylus movement; and
means for changing the first stylus identifier to a second stylus identifier in response to the stylus movement entering the second manipulation zone, and wherein the second stylus identifier is different than the first stylus identifier.

17. The computer program product as described in claim 14 further comprising:
means for selecting a manipulation mode wherein the manipulation mode is selected from the group consisting of an arc mode and a circle mode.

18. The computer program product as described in claim 14 further comprising:
means for superimposing a zoom arc on the geographical map wherein the first manipulation zone is a zoom zone and wherein the zoom zone corresponds to the zoom arc.

19. The computer program product as described in claim 14 further comprising:
means for superimposing a zoom circle on the geographical map wherein the first manipulation zone is a zoom zone and wherein the zoom zone corresponds to the zoom circle.

20. The computer program product as described in claim 14 wherein the second manipulation command is a pan command wherein the pan command includes a panning direction, the computer program product further comprising:
means for moving a panning distance on the first altered geographical map corresponding to the panning direction, the moving resulting in the second altered geographical map.

21. A method for handling views of a geographical map using a single stylus movement, said method comprising:
displaying the geographical map on a display;
detecting a stylus touch down location and a stylus movement, the stylus touch down location beginning the single stylus movement and corresponding to a location where the stylus contacts the display, and the stylus movement corresponding to a plurality of second locations to which the stylus is moved while contacting the display;
superimposing a first stylus identifier on the geographical map in response to the detecting, the location of the first stylus identifier corresponding to the stylus movement;
detecting, during the single stylus movement, that the stylus entered a first manipulation zone;
performing, during the single stylus movement, a first manipulation command in response to the stylus entering the first manipulation zone;
displaying a first altered geographical map that results from performing the first manipulation command to the geographical map;
detecting, during the single stylus movement, that the stylus exits the first manipulation zone and enters a second manipulation zone, the second manipulation zone different than the first manipulation zone;
changing the first stylus identifier to a second stylus identifier in response to the stylus movement entering the second manipulation zone, wherein the second manipulation zone is a pan zone and wherein the second stylus identifier is different than the first stylus identifier;
performing, during the single stylus movement, a second manipulation command in response to the stylus entering the second manipulation zone, the second manipulation command being different than the first manipulation command;
displaying a second altered geographical map that results from performing the second manipulation command to the first altered geographical map; and
after performing the first manipulation command and the second manipulation command, detecting a stylus liftoff point that identifies the stylus lifting off the display, which ends the single stylus movement.

22. A method for handling views of a geographical map using a single stylus movement, said method comprising:
displaying the geographical map on a display;
detecting a stylus touch down location and a stylus movement, the stylus touch down location beginning the single-stylus movement and corresponding to a location where the stylus contacts the display, and the stylus movement corresponding to a plurality of second locations to which the stylus is moved while contacting the display;
detecting, during the single stylus movement, that the stylus entered a first manipulation zone;
performing, during the single stylus movement, a first manipulation command in response to the stylus entering the first manipulation zone;
displaying a first altered geographical map that results from performing the first manipulation command to the geographical map;
detecting, during the single stylus movement, that the stylus exits the first manipulation zone and enters a pan zone;
identifying a pan command corresponding to the stylus movement entering the pan zone, the pan command including a panning direction;
performing, during the single stylus movement, the identified pan command with the first altered geographical map wherein the performing includes moving a panning distance on the first altered geographical map corresponding to the panning direction, the performing resulting in a second altered geographical map;

displaying the second altered geographical map that results from performing the pan command to the first altered geographical map; and after performing the first manipulation command and the pan command, detecting a stylus liftoff point that identifies the stylus lifting off the display, which ends the single stylus movement.

23. An information handling system comprising:

one or more processors;

a memory accessible by the processors;

one or more nonvolatile storage devices accessible by the processors;

a display accessible by the processors; and a map handling tool to handle views of a geographical map using a single stylus movement, the map handling tool including:

display logic for displaying the geographical map on a display;

stylus touch down detection logic for detecting a stylus touch down location and a stylus movement, the stylus touch down location beginning the single stylus movement and corresponding to a location where the stylus contacts the display, and the stylus movement corresponding to a plurality of second locations to which the stylus is moved while contacting the display;

imaging logic for superimposing a first stylus identifier on the geographical map in response to the detecting, the location of the first stylus identifier corresponding to the stylus movement;

first manipulation zone detection logic for detecting, during the single stylus movement, that the stylus entered a first manipulation zone;

first manipulation command logic for performing, during the single stylus movement, a first manipulation command in response to the stylus entering the first manipulation zone;

display logic for displaying a first altered geographical map that results from performing the first manipulation command to the geographical map;

second manipulation zone detection logic for detecting, during the single stylus movement, that the stylus exits the first manipulation zone and enters a second manipulation zone, the second manipulation zone different than the first manipulation zone;

stylus logic for changing the first stylus identifier to a second stylus identifier in response to the stylus movement entering the second manipulation zone wherein the second manipulation zone is a pan zone and wherein the second stylus identifier is different than the first stylus identifier;

second manipulation command logic for performing, during the single stylus movement, a second manipulation command in response to the stylus entering the second manipulation zone, the second manipulation command being different than the first manipulation command;

the display logic for displaying a second altered geographical map that results from performing the second manipulation command to the first altered geographical map; and stylus lift off logic for, after performing the first manipulation command and the second manipulation command, detecting a stylus liftoff point that identifies the stylus lifting off the display, which ends the single stylus movement.

24. A computer program product stored in a computer storage media for handling views of a geographical map, said computer program product comprising:

means for displaying the geographical map on a display;

means for detecting a stylus touch down location and a stylus movement, the stylus touchdown location beginning the single stylus movement and corresponding to a location where the stylus contacts the display, and the stylus movement corresponding to a plurality of second locations to which the stylus is moved while contacting the display;

means for superimposing a first stylus identifier on the geographical map in response to the detecting, the location of the first stylus identifier corresponding to the stylus movement;

means for detecting, during the single stylus movement, that the stylus entered a first manipulation zone;

means for performing, during the single stylus movement, a first manipulation command in response to the stylus entering the first manipulation zone;

means for displaying a first altered geographical map that results from performing the first manipulation command to the geographical map;

means for detecting, during the single stylus movement, that the stylus exits the first manipulation zone and enters a second manipulation zone, the second manipulation zone different than the first manipulation zone;

means for changing the first stylus identifier to a second stylus identifier in response to the stylus movement entering the second manipulation zone wherein the second manipulation zone is a pan zone and wherein the second stylus identifier is different than the first stylus identifier;

means for performing, during the single stylus movement, a second manipulation command in response to the stylus entering the second manipulation zone, the second manipulation command being different than the first manipulation command;

means for displaying a second altered geographical map that results from performing the second manipulation command to the first altered geographical map; and means for after performing the first manipulation command and the second manipulation command, detecting a stylus liftoff point that identifies the stylus lifting off the display, which ends the single stylus movement.

* * * * *